Patented July 7, 1936

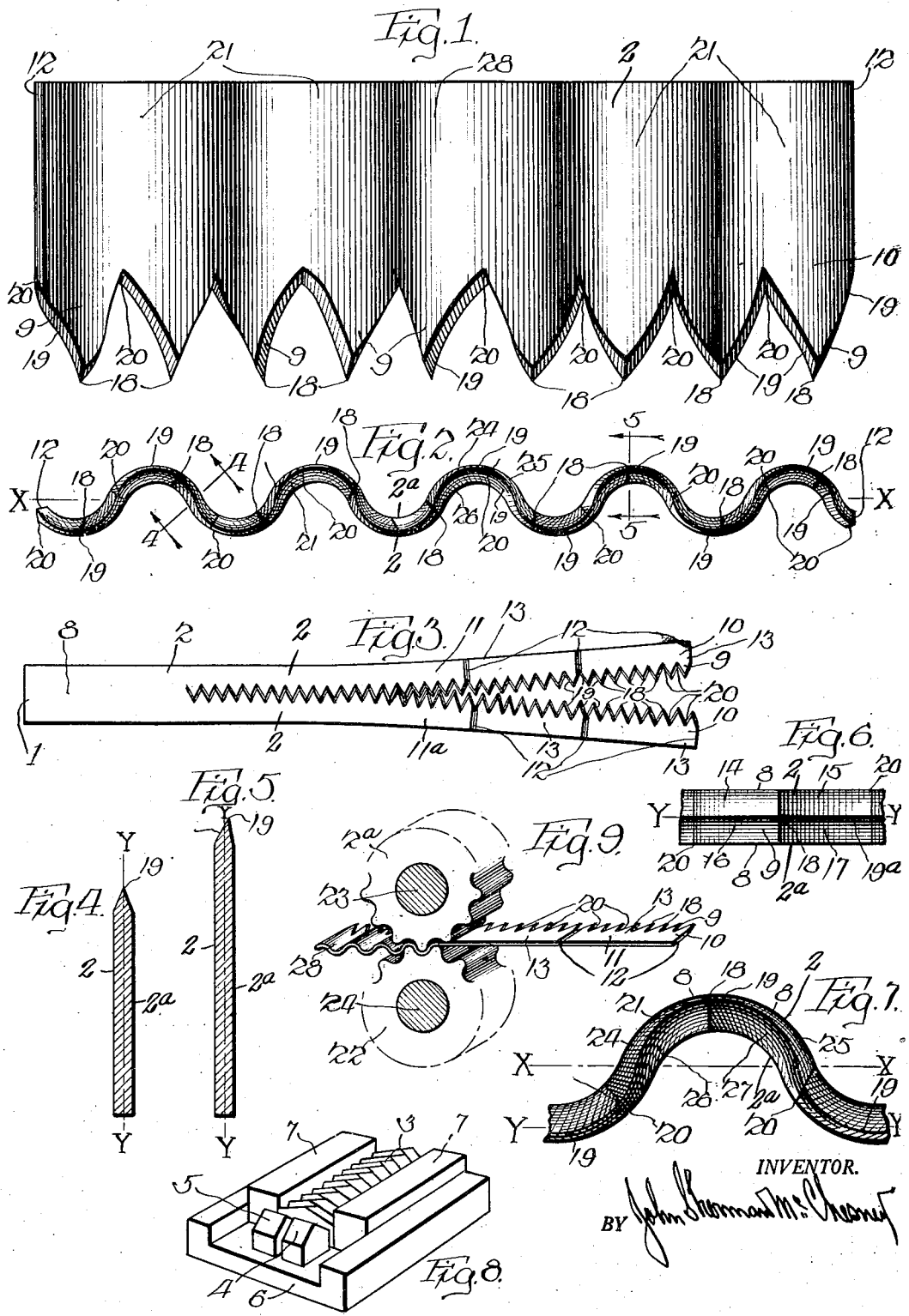

2,046,338

UNITED STATES PATENT OFFICE 2,046,338

SAW TOOTH CORRUGATED FASTENER

John Sherman McChesney, Chicago, Ill.; Lula A. McChesney, executrix of said John Sherman McChesney, deceased, assignor to Lula A. McChesney, Chicago, Ill.

Application February 27, 1933, Serial No. 658,712

11 Claims. (Cl. 85—11)

This invention relates to toothed fasteners adapted for various uses, but more particularly for fastening abutting pieces of wood.

The invention of this application is an article of manufacture disclosed in my co-pending applications pertaining to machines and methods of producing fasteners and particularly corrugated toothed fasteners of the parallel and of the divergently corrugated type. One of these co-pending applications is serially numbered 615,512, Corrugated joint fastener, filed June 6th, 1932; another 632,388, Machine for making and driving corrugated fasteners, filed September 9, 1932; and still another 633,611, Method of making saw toothed fasteners, filed September 17, 1932. In the application first named the invention disclosed therein pertains to a swage-beveled corrugated fastener, the second application pertains to a machine for swage-beveling and swage-severing a metallic ribbon into beveled-edged strips thereafter corrugating the strips and severing suitable lengths therefrom; whereas, the third application pertains to a method of producing swaged fasteners. This application is a continuation in part of my application Serial Number 615,512, Corrugated joint fasteners filed June 6, 1932, and the article described in the aforesaid application and the article produced by the aforesaid machine and in accordance with the aforesaid method constitutes the subject matter of this application.

One object of the present invention is to provide a swaged toothed fastener strip that is simple in construction and inexpensive to manufacture. Another object is the provision of a swage-hardened toothed penetrating edge on a fastener strip comprising a series of teeth having swage-beveled, oppositely inclined, sharp-cutting, knife-like edges parallel the relatively wide faces of the strip. A still further object is the provision of a toothed fastener having a swage-beveled, swage-hardened and swage-sharpened penetrating end produced in its finished form without loss of metal and requiring no further sharpening treatment. Another object is the provision of a fastener having a simultaneously swage-hardened, swage-beveled and swage-sharpened toothed penetrating end provided with a succession of oppositely beveled, oppositely inclined, relatively narrow, curved faces in combination with an undulating continuous knife-like cutting edge extending the entire length of the penetrating end of the fastener. Another object is the provision of a flat fastener having a toothed penetrating edge in combination with smooth, beveled, hardened, burr-free surfaces.

In the accompanying drawing I have shown one embodiment of the invention, but the construction shown therein is to be understood as illustrative only, and not as defining the limits of the invention. The drawing shows, moreover, the simple method of making the fastener and the fastener is shown on an enlarged scale for clearness.

In the accompanying drawing:

Figure 1 is a side elevation of the toothed corrugated fastener.

Fig. 2 is a plan view looking at the toothed edge of Fig. 1 illustrative of the undulating wave-like formation of the knife-like cutting edge positioned within the contour of the relatively wide corrugated side surfaces of the fastener, and of the tooth points in misaligned arrangement with respect to the plane of the medial line X—X of the fastener, i. e., that line midway the crests of the corrugations.

Fig. 3 is a side elevation, illustrative of the progressive steps in the swage-beveling and swage-severing treatment of a flat metallic ribbon to form toothed strips, the untreated portion of the ribbon merging into the initially treated portion and thereafter into the interspaced opposingly formed pre-sharpened and scored-to-length, uncorrugated finished fastener blanks in connected, scored, flat ribbon formation.

Fig. 4 is an end cross section on line 4—4 of Fig. 2 on the medial line of the fastener and substantially at right angles to the side edges of the corrugations and illustrative of the substantially equally beveled, penetrating end of V shaped appearance in end cross section.

Fig. 5 is an end cross section taken on line 5—5 of Fig. 2 on the crest of the corrugation and substantially at right angles to the side edges thereof and is illustrative of the unequally beveled penetrating end of V shaped appearance in end cross section.

Fig. 6 is a greatly enlarged view looking at the toothed edge of Fig. 3.

Fig. 7 is a greatly enlarged plan view looking at a section of a characteristic saw tooth edge of Fig. 3 and Fig. 6 after bending and rebending to produce corrugations.

Fig. 8 is a view in perspective of one of a set of co-acting swaging and scoring dies adapted to the manufacture of the fastener.

Fig. 9 is a perspective view illustrative of a finished toothed edged flat strip scored for breakability, being corrugated, and of a partly corrugated toothed fastener.

In the prior art as far as is known to me, all toothed corrugated fasteners having a sharpened beveled penetrating end, are made by methods employing the removal of metal and requiring numerous machine operations. In the making of prior art fasteners the first operation may consist of imparting a straight, beveled, cutting edge to a flat metal strip, and thereafter corrugating and removing portions of the corrugations to produce a toothed penetrating end, as hereinafter described; or may first require the corrugation of a flat metal strip, thereafter beveling one end of the corrugated strip to produce toothed formations on the penetrating end, either method requiring a series of slow, tedious and expensive operations usually comprising a process of grinding, milling, angularly shearing or rotary disk shearing thereby removing a relatively large part of the metal of the corrugations and producing a series of reversed beveled surfaces of crescent shaped appearance when viewed in side elevation. The pointed penetrating end members characteristic of these fasteners are positioned uniformly on, or centrally on, or spaced centrally diagonal the plane of the medial line of the fastener.

The grinding method is objectionable in that the metal is heated to such an extent that the temper is drawn, thereby softening the penetrating end and developing an over-hanging fin on the ground surface. The fins and softened metal impede downward progress causing the fastener to hunt and to tear the fibre during the penetration of the material into which the fastener is driven.

When milling and shearing methods are employed, the points of the teeth are, or should be, formed in the plane of the medial line of the fastener, and this treatment results in the formation of rough edges on the toothed edge and occasionally the points of the teeth are deflected to one side or the other of the medial line of the fastener, thereby requiring a further operation to reposition the strayed teeth and a deburring operation to remove fins and roughed-up metal of the toothed edge; the teeth are further processed by grinding to impart a desirably keen edge to the extreme points.

Outstanding features of novelty of my present invention are: swage-hardened, burnished, oppositely inclined, beveled, burr-free surfaces intersecting intermediate the longitudinal side edges at the penetrating end, forming cutting edges and tooth apexes.

In making my fastener, I employ a length of metallic ribbon 1, of the required width, gauge and temper, and having relatively wide parallel faces 2 and 2a. The ribbon is advanced in the direction of its length in guided position with relation to opposed co-acting tooth-swaging elements 3, and scoring elements 4 and 5 and combined stock guiding and contacting lands 7, all mounted in suitable element holder 6, said elements adapted to opposingly co-act in register with like elements. Operating means cause said co-acting elements to forcibly approach each other in register to within a pre-determined distance short of contact by combined ribbon guiding and opposed contacting lands 7. From time of contacting of the elements 3, 4 and 5 with the side surfaces 2 and 2a of the flat strip 1, to the seating of the contacting lands 7, the metal of the strip at the penetrating end 10 is opposingly compressed by the swaging elements functioning to opposingly impress their reverse formation into the relatively wide longitudinal surfaces 2 and 2a of the strip and intermediate the side edges thereof in the general direction of its length, thereby to simultaneously form well-defined oppositely beveled, oppositely inclined teeth 9 on the penetrating end 10 of each opposingly swage-formed, separated, beveled, sharpened, flat fastener strip 11 and 11a. At pre-determined intervals transverse scorings 12 are concurrently impressed by the co-acting scoring elements 4 and 5 preferably arranged to score at the tooth roots 20. The finished scored-to-length flat fastener blanks 13, positioned end to end, require no further treatment to complete the finished fastener, except, to bend and rebend to form corrugations 21. The corrugating rolls 22—22a act to position the tooth apexes 18 in random or other desired relation on the penetrating end 10 and to disengage the finished fastener 28 from the next succeeding fastener blank 13 at the scoring 12.

The tooth 9, is bounded by four work-hardened surfaces formed by oppositely inclined, oppositely swage-beveled planes of surfaces 14 and 15 on the one side of the mid-line Y—Y of the flat strip and by similar surfaces 16 and 17 as illustrated in Fig. 6.

During the corrugating of the strips the apexes of the teeth are positioned in misaligned relation with respect to the mid-line of the fastener and the cutting edges of the teeth assume a wave-like formation within the confines of the side edges of the corrugations and short of the outer edges at the crests of the corrugations. In the finished corrugated fastener the pyramidal work-hardened apex of each tooth is bounded by four oppositely beveled, oppositely inclined, intersecting, curved surfaces, forming four curved, oppositely inclined edges originating at the apex, i. e., two relatively short edges extending oppositely from the apex and terminating on the longitudinal side edges of the corrugations at substantially right angles thereto, and two relatively long, curved, sharp-cutting, oppositely inclined edges extending from the apex and between the longitudinal side edges of the corrugations and terminating at the tooth root, joined and continuing in like manner on each succeeding tooth, thus forming a continuous wave-like cutting edge on the work-hardened penetrating end of the fastener. The continuous swage-hardened knife-like cutting edge is of wavy appearance and lies entirely within the longitudinal side edges.

The four opposed planes of the beveled surfaces 14—15 and 16—17 intersect to form a pyramidal apex 18 intermediate the side surfaces 2 and 2a and the paired planes of surfaces 14, 16 and 15, 17 form a knife-like, sharp, hardened, continuous cutting edge 19a extending uninterruptedly from tooth root 20, to apex 18, to the next tooth root 20, and in like manner connect successively thereafter on each tooth of the penetrating end of the fastener. The tooth of smooth burr-free work-hardened burnished surfaces of the bevels 14, 15 and 16, 17 and the metal included therebetween, is of greater hardness and density than the adjacent metal of the strip. These features of novelty are characteristic of the burr-free penetrating end of this and of the fasteners disclosed in the above mentioned co-pending applications.

The increased density of the metal of the fastener imparts to the apexes and the cutting edges formed by the intersections of the planes, increased strength, whereby they become better adapted to resist deformation, to maintain their sharp knifelike cutting edges, and to drive easily and cleanly into the material to be joined either with or across the grain, than fasteners of the prior art. I find it desirable to score the fastener strip at pre-determined intervals in such manner as to produce full teeth and the scorings 12 are preferably so positioned as to extend transverse the faces 2 and 2a to the tooth root 20. The severed sections or blanks 13 shown in Fig. 3, thus provide flat fasteners having swage hardened, swage-severed and swage-sharpened teeth 9 which flat fasteners are useful for certain purposes. The corrugated fastener is completed when the flat blanks 13 are bent and rebent in the forming of corrugations 21. Any suitable machinery may be employed for corrugating and for this purpose and to produce fasteners of the parallel, or of the divergent type, I find mated corrugating rolls 22 and 22a mounted on shafts 23 and 23a respectively to be well adapted for the work of corrugating, for positioning the teeth apexes in pre-determined relation with respect to the medial line X—X of the corrugated fastener, and for separating the finished fastener at the scored lines 12.

The surfaces 14, 15 and 16, 17 of the uncorrugated strip become the curved beveled surfaces 24, 25, 26, 27 respectively of the corrugated strip. As illustrated in Fig. 5 and Fig. 7 the beveled surfaces 24, 25 intersecting with the beveled surfaces 26, 27 form the curved continuous cutting edge 19, of sinous or of wave-like formation which remains in plan view within the contour of the side surfaces of the fastener and approaches and lies substantially upon the crest of the corrugations 21 at the outer edge thereof, i. e., that crest edge farthest away from the medial line X—X of the corrugated fastener.

The cutting edge 19 retains its sinuous or wave-like formation as shown in Fig. 1 and Fig. 7 with respect to the corrugations and thruout the length of the corrugations of the fastener, independent the position of, or arrangement of, the number of teeth, or the spacing of the teeth. In Fig. 5 the cutting edge 19 is on the outer crests of the corrugations and coincides with the apex 18 of the tooth formation. Reference being had to Fig. 2, the cutting edge 19 of Fig. 5 retains the same relative position on each of the outer crests of the fastener irrespective of the changing position of the succeeding apexes 18 and the root 20 thereof, and in like manner the cutting edge 19 crosses the mid-line X—X of the corrugations of the fastener substantially on the mid-line of the strip Y—Y as shown in end cross section in Fig. 4.

The beveled curved surfaces 24 and 25 adjacent the outer edge of the crests of the corrugations are of less included angle than the opposed curved surfaces 26 and 27 which face the mid-line X—X, as in Fig. 7. From this novel arrangement of the beveled teeth and unsymmetrical or random apexes, it is obvious that, during the driving operation, the material intermediate the inner crests of the corrugations is acted upon approximately thru an arc of 180 degrees, is crowded, compressed and confined between the inclined surfaces 26 and 27 of the inner crests of the corrugations, whereas, the oppositely positioned, curved beveled surfaces of the outer crests of the corrugations are substantially parallel to the surface 2 of the corrugated strip. These slightly beveled curved surfaces 24 and 25 exert a comparatively small wedging force against the material into which they are driven, when compared with the wedging force exerted similarly by the flat faces of the equally beveled penetrating end of fasteners of the prior art. As a result of this novel construction I provide a tooth form having the depth of the teeth so proportioned that the fastener may be driven without self-clinching and in a straight line of penetration. My fastener is better adapted to be driven into material of narrower width, than fasteners of the prior art, due to the novel tooth configuration and staggered arrangement of the apexes and to the relatively small included angle of the curved surfaces on the outer edge of the crests of the corrugations.

The property of self-clinching may be imparted to the tooth 9 by a change in tooth form or by changing the length of the tooth between the apex 18 and the root 20, or by increasing or decreasing the temper of the metal. The above, in combination with the greater included angle of the bevels of the inner crests of the corrugations, exerts on the tooth apex 18 a lateral force sufficient to cause the tooth to travel outwardly, traverse the direction of penetration of the corrugations.

Manifestly, the construction shown is capable of a wide range of modifications, for example, the distance between the root 20 and the apex 18 may be of any desired depth; the distance between the roots 20 of each tooth may be of any desired width. Both the depth and the width of the tooth may be varied within each fastener blank, more particularly to form the wide central tooth of the divergent fastener, thus producing a variety of tooth formations on the same blank. In the prior art, the number of corrugations bears a direct numerical ratio of one corrugation to two apexes when the teeth are formed after corrugating. The substitution of modified tooth form I do not consider a departure from my construction and such modification as is within the scope of my claims, I consider within the spirit of my invention.

I claim:
1. A fastener comprising a swage-bevelled swage-sharpened toothed edged strip swage-severed from metallic ribbon, corrugations extending traverse said toothed edge, said toothed strip having curved bevelled side surfaces on the penetrating end thereof, said teeth having apices positioned in misaligned relation with respect to the medial line of the corrugations, said toothed strip having two apices on each corrugation.

2. A fastener comprising a length of corrugated metal having a series of teeth, each of said teeth being defined by beveled side surfaces which are curved and extend oblique the medial plane of the fastener.

3. A fastener comprising a length of corrugated metal having a series of teeth, each of said teeth being defined by beveled side surfaces which are curved and extend oblique the medial plane of the fastener, the outer edges of said beveled surfaces forming an undulating continuous cutting edge when the fastener is viewed in elevation from its entering end.

4. A fastener comprising a length of corrugated metal having an entering edge consisting of a series of teeth, the opposed side surfaces of which are beveled, the outer edges of said side surfaces forming an undulating continuous cutting edge when the fastener is viewed in elevation from its entering end.

5. A fastener comprising a length of corrugated metal having an entering edge consisting of a series of teeth, the opposed side surfaces of which are beveled and swage-hardened, the outer edges of said beveled and swage-hardened side surfaces forming an undulating continuous swage-hardened cutting edge when the fastener is viewed in elevation from its entering end.

6. A fastener comprising a length of corrugated metal having a series of swaged hardened teeth on one edge thereof, the hardened surfaces of the metal of the opposite sides of said teeth being curved and oppositely beveled, the outer edges of said oppositely beveled surfaces forming an undulating cutting edge when the fastener is viewed in elevation from its entering end.

7. A fastener comprising a length of corrugated metal stock having a series of swage-hardened teeth on one edge thereof, the hardened surfaces of the metal of the opposite sides of each of said teeth being curved and oppositely beveled, the outer edges of said swage-beveled surfaces forming a cutting edge when the fastener is viewed in elevation from its entering end, said cutting edge lying entirely within the contour of the corrugations and short of the outer crests of the corrugations on the convex sides thereof, said cutting edge intermediate the crests of the corrugations lying substantially midway the side faces of the metal stock.

8. A fastener comprising a length of corrugated metal having a series of swage-hardened teeth on one edge thereof, the hardened surfaces of the metal of the opposite sides of each of said teeth being curved and oppositely beveled, the outer edges of said oppositely beveled surfaces forming an undulating cutting edge when the fastener is viewed in elevation from its entering end, the oppositely beveled opposite side surfaces presenting four beveled faces defining a pyramidal apex for each tooth.

9. A fastener comprising a length of corrugated metal having an entering edge consisting of a series of teeth, the opposed side surfaces of which are beveled, the outer edge of said side surfaces forming an undulating continuous cutting edge when the fastener is viewed in elevation from its entering end, the points of said series of teeth lying in unsymmetrical arrangement with respect to each other.

10. A sheet metal fastener comprising a strip of metal having a series of transverse corrugations, each corrugation being relatively small with respect to the length of the strip, said fastener being provided on its entering end with a series of swage-hardened teeth, the hardened surfaces of the metal of the opposite sides of each of said teeth being curved and beveled and the ratio of said teeth to each of said relatively small corrugations being greater than two to one.

11. A fastener device comprising a length of metal stock provided with a swaged serrated beveled cutting edge, said metal being corrugated transversely of the serrated cutting edge forming a series of curved teeth having curved beveled side edges, said series of teeth being positioned by the corrugations to present a group of apexes alternately disposed with respect to a next adjacent group on opposite sides of the longitudinal mid plane of the fastener.

JOHN SHERMAN McCHESNEY.